(12) United States Patent
Linkola et al.

(10) Patent No.: US 6,934,391 B1
(45) Date of Patent: Aug. 23, 2005

(54) METHOD AND APPARATUS FOR CONTROL OF A SUBSCRIBER IDENTITY MODULE IN A DATA COMMUNICATION SYSTEM

(75) Inventors: Janne Linkola, Espoo (FI); Olavi Blomberg, Kauniainen (FI)

(73) Assignee: Sonera Oyj, Helsinki (FI)

( * ) Notice: Subject to any disclaimer, the term of this patent is extended or adjusted under 35 U.S.C. 154(b) by 0 days.

(21) Appl. No.: 09/449,134

(22) Filed: Nov. 24, 1999

(30) Foreign Application Priority Data

Jun. 4, 1997 (FI) .................................................. 972369
Jun. 2, 1998 (WO) ................................ PCT/FI98/00476

(51) Int. Cl.⁷ ................................................ G06F 11/30
(52) U.S. Cl. ........................ 380/247; 380/270; 713/168
(58) Field of Search ............................... 713/156, 159, 713/160, 170, 171, 179, 200, 201; 709/318, 104.1, 206, 208, 223; 380/228, 233, 247, 270, 277, 281, 285, 28, 29, 30, 227, 229; 705/75; 455/410, 411, 433, 558

(56) References Cited

U.S. PATENT DOCUMENTS

| | | | |
|---|---|---|---|
| 5,309,501 A | * 5/1994 | Kozik et al. ................. | 455/410 |
| 5,590,175 A | * 12/1996 | Gallant et al. ............... | 455/433 |
| 5,749,053 A | * 5/1998 | Kusaki et al. ................ | 455/24 |
| 5,852,665 A | * 12/1998 | Gressel et al. ................ | 380/30 |
| 5,873,030 A | * 2/1999 | Mechiling et al. .......... | 455/408 |
| 5,956,637 A | * 9/1999 | Ericsson et al. ............. | 455/414 |
| 6,064,887 A | * 5/2000 | Kallioniemi et al. ....... | 455/455 |
| 6,366,777 B1 | * 4/2002 | Uusitalo ...................... | 455/433 |
| 6,501,962 B1 | * 12/2002 | Green ......................... | 455/558 |
| 6,546,243 B2 | * 4/2003 | Tiedemann, Jr. et al. ... | 455/419 |
| 6,665,529 B1 | * 12/2003 | Mills, Jr. .................... | 455/411 |

FOREIGN PATENT DOCUMENTS

| | | |
|---|---|---|
| DE | 43 21381 A1 | 1/1995 |
| EP | 0 789 500 A2 | 2/1996 |
| WO | WO 96/11557 | 4/1996 |
| WO | WO 96/27270 | 9/1996 |
| WO | WO 97/30561 | 8/1997 |
| WO | WO 97/36437 | 10/1997 |

\* cited by examiner

*Primary Examiner*—Kim Vu
*Assistant Examiner*—Leynna Ha
(74) *Attorney, Agent, or Firm*—Cohen, Pontani, Lieberman & Pavane

(57) ABSTRACT

A method and apparatus for the control of a subscriber identity module (SIM) in a data communication system, preferably a mobile communication system. The data communication system includes first and second subscriber registers (HLR1, HLR2) for maintaining subscriber records defining a subscriber identity module registry, a short message transmission system (SMSC) for transmission of messages in the communication system, and a mobile station (MS) connected to the subscriber identity module (SIM) for use by a subscriber in effecting mobile communications through the data communication system. The subscriber identity module (SIM) stores therein data comprising a first subscriber code (IMSI1) and an encrypted code key ($K_i$) corresponding to a first subscription for the mobile station subscriber and associated with the subscriber identity module A record of data corresponding to the first subscription is created in the first subscriber register (HLR1) when the first subscription is opened, the record comprising a first subscription specific call number (MSISDNx), the encryption code key ($K_i$) and a subscriber identity code (IMSI1) for the mobile station subscriber. A second subscription for the mobile station subscriber and associated with the subscriber identity module (SIM) is opened; a record corresponding to the opened second subscription and comprising a second subscription-specific call number (MSISDN), a second subscriber identity code (IMSI1) and the encryption key ($K_i$) is created in the second subscriber register (HLR2); a message (SMS) is sent through the communication system directed to the first subscription and instructing that the data stored in the subscriber identity module be changed from data corresponding to the first subscription to data corresponding to the second subscription.

10 Claims, 1 Drawing Sheet

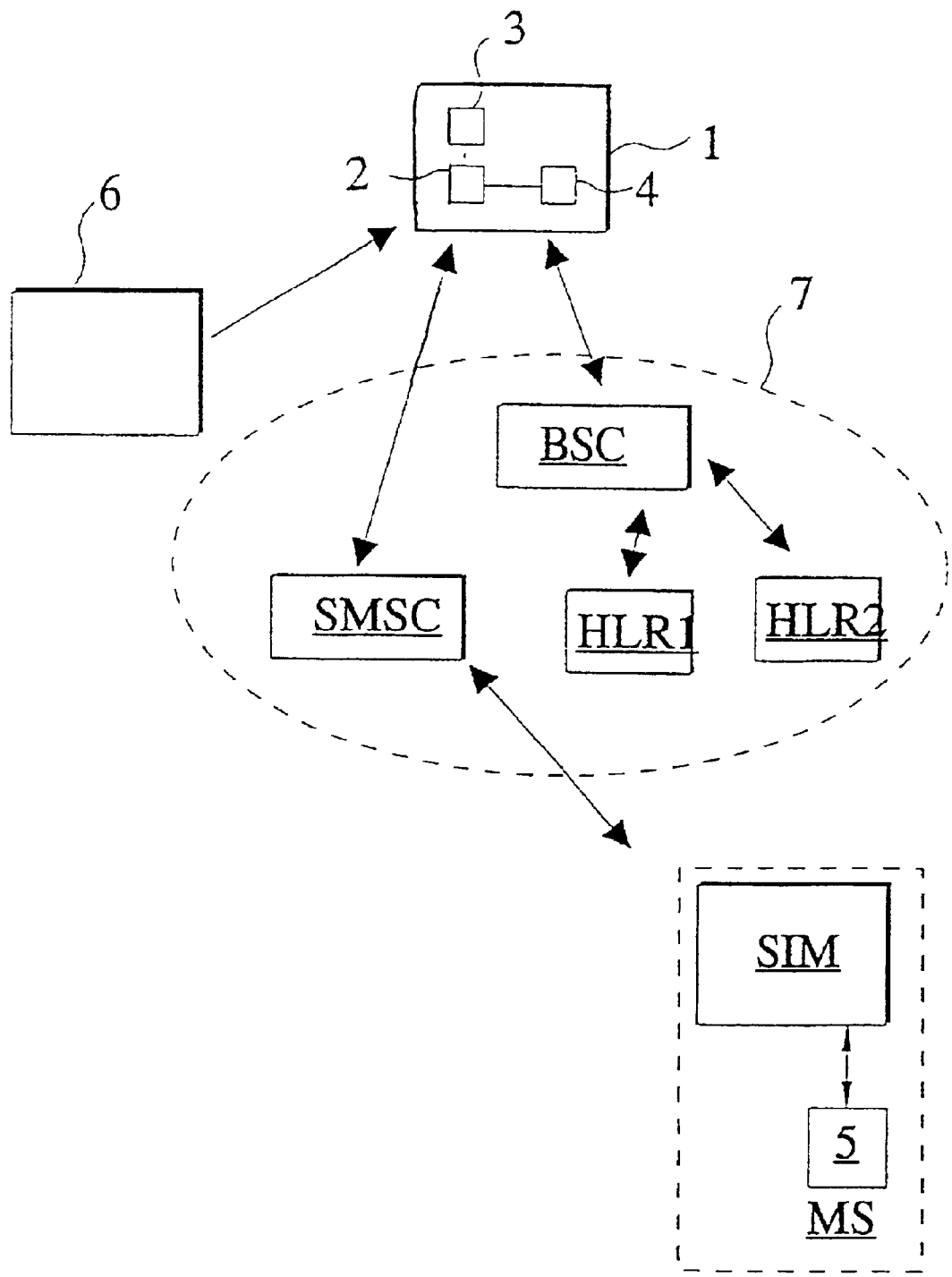

METHOD AND APPARATUS FOR CONTROL OF A SUBSCRIBER IDENTITY MODULE IN A DATA COMMUNICATION SYSTEM

CROSS REFERENCE TO RELATED APPLICATIONS AND PRIORITY CLAIM

This is a U.S. national stage of application No. PCT/FI98/00476, filed on Jun. 2, 1998. Priority is claimed on that application and on the following application:
Country: Finland, Application No.: FI972369, filed: Jun. 04, 1997.

BACKGROUND OF THE INVENTION

1. Field of the Invention

The present Invention relates to a method and apparatus for the control of a subscriber identity module in a data communication system, preferably a mobile telephone network.

2. Description of the Background Art

In a mobile communication system, system subscriber data are stored in a unit or device specially designed for data management. For instance, in a GSM system such a device is the home location register (HLR). Stored in the HLR are certain parameters related to the subscriber or subscription, such as the mobile subscriber international ISDN number (MSISDN) and the international mobile subscriber identification (IMSI) code.

In practice, the capacity of a single physical home location register is limited. For example, the home location register devices used in GSM systems can typically handle about 200,000 to 300,000 customers. Therefore, large operators require at least several home location register devices.

The data contained in the subscriber identity module that is used in a mobile communication system includes the same data that are stored in the home location register. In addition to that data, the subscriber identity module contains a secret key $K_i$ used for encryption of wireless or radio communications and for authentication of the mobile station. The data are generally added at the last stage of production of the subscriber identity module in conjunction with its personalization. After such personalization, changing that data is either very difficult or impossible.

Nevertheless, the customer may lose his/her subscriber identity module, or the module may be damaged. Therefore, the operator must store subscriber identity modules suited for all home location registers at each customer service point if the operator wishes to provide flexible and full service operations for the renewal, reconstitution and control of subscriber identity modules. If the operator has, by way of example, 20 home location registers in its mobile communication system, then the customer service points must have an assortment of 20 subscriber identity modules containing different data This gives rise to a distinct logistical problem as well as problems of efficiency concerning invested capital in the maintained subscriber identity modules.

OBJECTS AND SUMMARY OF THE INVENTION

It is accordingly the desideratum of the present invention to eliminate the difficulties and drawbacks inherent in prior art systems as described above. It is a specific object of the invention to present a new manner of procedure for the control of subscriber identity modules in a data communication system.

It is a further object of the invention to provide an apparatus that can be used to readily change the data in a subscriber identity module and thereby implement flexible maintenance and control of the module.

Another object of the invention is to give the operator a chance to improve customer service, specifically by improving its capabilities to the readily change or modify existing subscriber identity modules and to replace damaged modules.

The inventive method for the control of a subscriber identity module, which contains or stores a subscriber identity code and a secret key, is carried out in a data communication system, such as the preferred mobile communication network, wherein the system or network comprises a subscriber register for the maintenance of a subscriber identity module register, a message transmission system for the transmission of messages in the mobile communication network, and a mobile station to which the subscriber identity module is connected. In accordance with the method, a record is created in the subscriber register when the first subscription for a subscriber is opened, said record comprising a call number specific to the subscription, an encryption code and a subscriber identity code associated with the subscription. Services specified for the particular subscriber in the mobile communication network can also be stored in a home location register. The home location register is preferably a register in a GSM mobile communication network and contains subscriber specific information relating to subscriber right of use and to permitted or available functions. When the subscriber enters the geographical area of a mobile communication switching center, the mobile station reports to its visitor location register (VLR) . The mobile communication switching center then fetches the subscriber data from the subscriber's home location register and sends them to the visitor location register of its own area and simultaneously updates the location data for the subscriber.

As was mentioned hereinabove, large mobile communication networks typically comprise multiple home location registers. Furthermore, the range of subscriber identity codes (IMSI) of a single home location register can be divided into several sections which means that, insofar as control of subscriber identity modules, a single physical subscriber register device may comprise at least several subscriber registers (containing different INSI ranges).

In accordance with the inventive method, a second subscription associated with the subscriber identity module is opened. At the same time, a record comprising the call number, subscriber identity code and key corresponding to the second subscription is created in a subscriber register, which is generally different from the home location register containing the record for the first subscription. A message comprising an instruction for changing the data for the first subscription in the subscriber identity module is then sent to the first subscription and further to the subscriber identity module and, based on the message, the data for the first subscription as stored in the subscriber identity module are changed to the data for the second subscription. As a result, the subscriber identity module and the mobile station to which the subscriber identity module is connected will thereafter function in accordance with the services and permitted functions as defined for the second subscription.

By way of comparison with prior art, the present invention advantageously permits significantly simplified control of subscriber identity modules in even very large mobile communication systems.

A further advantage of the present invention is that the operator of the mobile communication network can avoid the logistical problems caused by the unavoidable use of multiple different subscriber identity modules. Moreover, the procedure of the invention allows for better and faster customer service in respect of the maintenance, reprogramming and replacement of subscriber identity modules.

In one embodiment of the invention, a message is received and the data are changed when the mobile station is switched on for the first time with the subscriber identity module connected to the mobile station. Upon receipt of the message, an acknowledgement of receipt is sent by the mobile station. Based on this acknowledgement, the mobile communication system removes the first subscription from the data communication system and from the home location register. It is also within the scope and contemplation of the invention for the mobile station to send the acknowledgement only after the subscriber identity module has processed the message—as contrasted with immediately upon its receipt of the message—, thus assuring that the data in the subscriber identity module have been successfully changed.

In an embodiment of the present invention, the system waits for an acknowledgement from the mobile station of its receipt of the message for a predetermined period of time, as for example 24 hrs and, if no acknowledgement is received within this period, the message is sent again. The new message may also be addressed or sent to both the first and second subscriptions, since it is possible that the data in the subscriber identity module have already been changed but that no acknowledgement was sent before the mobile station lost its connection with the network. This procedure accordingly guarantees that the mobile station and the subscriber identity module will receive the message that was sent and, based on that message, will carry out the changes in the subscriber identity module and thereby assure that the subscriber data in the mobile communication system remains up to date.

In an embodiment of the invention, the acknowledgement of receipt of the message can be defined as the occurrence of a mobile station corresponding to or identified by the second subscription being attached to the system (i.e. an IMSI attach). In conjunction with such confirmation of the change of the data in the subscriber identity module, the subscriber identity code corresponding to the first subscription is deleted from the subscriber identity module. In addition, the temporary mobile subscriber identity (TMSI) code can be deleted.

In accordance with the inventive apparatus, the data communication system of the invention, such as the preferred mobile communication network, comprises a control device which includes means for opening a second subscription associated with the subscriber identity module, and means for creating a record in the subscriber register, the record comprising the call number, subscriber identity code and key corresponding to the second subscription. The data communication system further comprises means for generating a message to be sent to the first subscription, said message containing an instruction for changing the data corresponding to the first subscription in the subscriber identity module, and means for changing the data corresponding to the first subscription as stored in the subscriber identity module into the data corresponding to the second subscription.

The control device is preferably disposed in conjunction with the billing and customer control system in the data communication system or mobile communication network.

In addition, the message transmission system used in the network or system of the invention may be a short message system.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The single drawing figure diagrammatically depicts a data communication system in accordance with the inventive apparatus, and in which the inventive method may be practiced.

DETAILED DESCRIPTION OF THE CURRENTLY-PREFERRED EMBODIMENTS

The data communication system shown in the drawing, preferably a GSM system, comprises a mobile station MS, a subscriber identity module SIM connected too the mobile station and, in the mobile station, means 5 for changing the data stored in the subscriber identity module SIM from that of or corresponding to the first subscription to that of or corresponding to the second subscription. In the mobile station, the data changing means 5 is preferably implemented as a part of the controller of the subscriber identity mobile SIM or as a part of the subscriber identity module itself.

The data communication system shown in the drawing further comprises a short-message switching center SMSC and a base station controller BSC. The base station controller includes a plurality of associated home location registers HLR1, HLR2, two such home location registers being depicted by way of illustrative example although, as will be appreciated, the number of home location registers will vary as a function of the number of subscribers to the data communication system.

The communication system presented in the drawing further comprises a control device 1 disposed, for example, in conjunction with the billing and customer control system (not shown). An agency apparatus 6 is also provided at an agency that sells subscriptions to the communication system; the apparatus 6 is used to transmit each new subscriber's service and function data to the data communication system. In the drawing, the signaling that takes place between the various devices is represented by arrows, with the arrowhead direction indicating the signaling direction.

The control device 1 comprises means 2 for opening a second subscription, means 3 for creating a record in the subscriber register, and means 4 for generating a message to be sent over the communication system to the first and/or second subscription. These means 2, 3, 4 may, as is preferred, be implemented in one and the same computer or processing device which is provided with suitable software for carrying out the aforementioned functions and with an appropriate interface for connecting the computer to the mobile communication network 7. With this arrangement, the properties and operational functions of the means 2, 3, 4 can be flexibly altered by simply changing the software used in the computer.

With reference to the drawing, by way of example and in accordance with a preferred embodiment of the invention, the agency or other seller of the subscription provides or identifies to the system the international mobile station identity (IMSI) code of the subscriber identity module and the international telephone number of the subscription. This number pair is transmitted via the agency apparatus 6 to the control device 1. The control device 1 then opens in the billing and customer control system two subscriptions whose parameters are (IMSI1, MSISDNx, $K_1$) and (IMSI2, MSISDN, $K_1$), where IMSI is the subscriber identity code, MSISDN is the subscriber's international telephone number, and $K_1$ is the subscriber's secret key used for encryption of radio communication and for authentication of the mobile station. Based on the function, records are also created in the first subscriber register HLR1 and the second subscriber register HLR2, respectively. In this example, the subscription corresponding to the first subscriber identity code IMSI1 contains only one service, namely the short-message service. For the subscription corresponding to the second subscriber identity code 1M5I2, all of the services chosen by the subscriber are activated and corresponding information is sent to the control device 1 via the agency device 6.

Once the two subscriptions have been opened, the control device 1 of the invention sends a short message SMS corresponding to the MSISDNx telephone number to the first subscription via the short-message switching center SMSC. After the short message has been sent by the short-message switching center and received by the mobile station to which the subscriber identity module is connected, the IMSI1 code stored in the subscriber identity module SIM of the subscriber's mobile station is changed to the value IMSI2, and the initially-stored ISMS1 and TIMSI codes in the subscriber identity module are deleted. When the mobile station is then switched off and again switched on, the data in the subscriber identity module will be that corresponding to the second subscription, i.e. the subscription for which the subscriber identity code is IMS12 and for which the international telephone number is MSISDN.

The mobile station also sends over the communication system an acknowledgement of its receipt of the short message and, when that acknowledgement is received by the inventive control device 1, the control device deletes the data corresponding to the first subscription from the billing and customer control system. As will be apparent, however, it is possible in such circumstances that the subscriber's mobile station is switched off before the acknowledgement has been sent and the data changed, in which case the rest of the communication system will not know that the subscription data has been changed. In recognition of this possibility, in a modified embodiment of the invention the control device is provided with a timeout period during which it monitors for receipt of the acknowledgement from the mobile station. If no acknowledgement has been received within the predetermined timeout period, e.g. for 24 hours, then a short message is sent to the mobile station number MSISDN that corresponds to the second subscription. When an acknowledgement to either of the messages is thereafter received, then at that time and based on that acknowledgement the data corresponding to the first subscription are deleted from the billing and control system.

It is further possible that the deletion of data occur as a consequence of an action carried out by another customer or subscriber or by a terminal device held by another customer. One way in which this may take place is, by way of illustrative example, in response to a first attachment (i.e. an IMSI attach) of another subscription received in the mobile communication network, of which notice is transmitted to the service control device.

Thus, and as should now be apparent, the inventive solutions is based on the combined use of prior-art short messages, a subscriber register and a billing and customer control system. In this manner there is created an operations model in accordance with which the system operator need order and maintain only a single type of subscriber identity modules while maintaining the ability to offer flexible card change services at all customer service points. The invention further contemplates the use of other like and equivalent methods and arrangements in a mobile communication network for transmission of the messages to the subscriber identity modules.

While there have shown and described and pointed out fundamental novel features of the invention as applied to preferred embodiments thereof, it will be understood that various omissions and substitutions and changes in the form and details of the methods disclosed and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method, for use in a mobile data communication system that includes: first and second subscriber registers (HLR1, HLR2) for maintaining subscriber records;
   a message transmission system (SMSC) for transmitting messages in the communication system; and
   a mobile station (MS) for use by a subscriber in effecting mobile communications through said mobile data communication system
   said method being for controlling a subscriber identity module (SIM) attached to said mobile station (MS), in which subscriber identity module (SIM) is stored subscription data comprising a first subscriber identity code (IMSI1) and an encryption code key ($K_i$) corresponding to a first subscription for the mobile station subscriber such that when said first subscription is opened for said mobile station subscriber, a record of data corresponding to said first subscription, with said record comprising:
   a first subscription-specific call number (MSISDNx),
   said encryption code key ($K_i$), and
   said first subscriber identity code (IMSI1) for said mobile station subscriber, is created in said first subscriber register (HLR1);
   said method comprising the steps of:
   a.) opening a second subscription for said mobile station subscriber;
   b.) creating in said second subscriber register (HLF2) a record of data corresponding to said opened second subscription, and comprising:
   a second subscription-specific call number (MSISDN),
   said encryption code key ($K_i$), and
   a second subscriber identity code (IMSI2) for said mobile station subscriber;

c.) transmitting through said mobile data communication system to the mobile station (MS) a message (SMS) addressed to said first subscription-specific call number (MSISDNx), said message instructing to change said first subscriber identity code (IMSI1) comprised in said subscription data stored in said subscriber identity module (SIM) into said second subscriber identity code (IMSI2); and d.) changing, at said subscriber identity module (SIM) attached to said mobile station (MS) and in response to receipt of said message (SMS), said first subscriber identity code (IMSI1) into said second subscriber identity code (IMSI2).

2. The method in accordance with claim 1, further comprising the steps of:

e.) transmitting through said mobile data communication system a first acknowledgement of receipt of said message (SMS), and of success in changing the stored data in said subscriber identity module; and f.) removing from said first subscriber register (HLR1), in response to receipt of said acknowledgement, the record of data corresponding to said first subscription.

3. The method in accordance with claim 1, further comprising the steps of:

e.) transmitting through said mobile data communication system a first acknowledgment of receipt of said message (SMS), and of success in changing the stored data in said subscriber identity module;

f.) transmitting through said mobile data communication system a second message (SMS2) directed to said second subscription;

g.) transmitting through said mobile data communication system a second acknowledgement of receipt of said second message (SMS2); and h.) removing from said first subscriber register (HLR1), in response to receipt of either said first acknowledgment or second acknowledgement, the record of data corresponding to said first subscription.

4. The method in accordance with claim 1, further comprising the steps of:

e.) waiting, following said transmitting of said message (SMS) directed to said first subscription, for a predetermined period of time for receipt of said first acknowledgement; and f.) transmitting through said mobile data communication system a second message (SMS2) directed to said second subscription, if said first acknowledgment is not received within said predetermined period of time.

5. The method in accordance with claim 4, further comprising the steps of:

g.) detecting when said second subscription is attached to said mobile data communication system; and h.) removing from said first subscriber register (HLR1) the record of data corresponding to the first subscription upon detection that the second subscription is attached to the communication system.

6. The method in accordance with claim 1, wherein said changing step (d.) further comprises removing from said subscriber identity module a temporary subscriber identity code (TMSI) stored in said subscriber identity module with said first subscription data.

7. The method in accordance with claim 1, wherein said mobile data communication system comprises a Global System for Mobile communications (GSM) mobile communication system.

8. A mobile data communication system comprising:

a.) first and second subscriber registers (HLR1, HLR2) for maintaining subscriber records defining a subscriber identity module registry;

b.) a message transmission system (SMSC) for transmission of messages in said mobile data communication system;

c.) a mobile station for use by a subscriber in effecting mobile communications through said mobile data communication system;

d.) a subscriber identity module (SIM), connected to said mobile station, for storing in said subscriber identity module data comprising:
  i) a first subscriber identity code (IMSI1), and
  ii) an encryption code key ($K_i$) corresponding to a first subscription for said mobile station subscriber and associated with said subscriber identity module (SIM), in which, when said first subscription is opened for said mobile station subscriber, a record of data corresponding to said first subscription, and comprising:
  a first subscription-specific call number (MSISDNx),
  said encryption code key ($K_i$), and
  said first subscriber identity code (IMSI1) for said mobile station subscriber;
  is created in said first subscriber register (HLR1), e.) a control device for controlling said subscriber identity module (SIM), and comprising:
  i.) first means for opening in said second subscriber register (HLR2) a record of data corresponding to said opened second subscription with said record of data comprising:
    a second subscription-specific call number (MSISDN),
    said encryption key ($K_i$),
    a second subscriber identity code (IMSI2) for said mobile station subscriber;
  ii) second means for generating a message (SMS) to be directed through said mobile data communication system to said first subscription and instructing a change in the data stored in said subscriber identity module from data corresponding to said first subscription to data corresponding to said second subscription; and
  iii) third means for changing the data stored in said subscriber identity module (SIM) from data corresponding to said first subscription to data corresponding to said second subscription.

9. The mobile data communication system of claim 8, wherein said control device is disposed in conjunction with a billing and customer control system of said mobile data communication system.

10. The mobile data communication system of claim 8, wherein said message transmission system comprises a short message system.

* * * * *